United States Patent [19]

Deering

[11] Patent Number: 4,742,551
[45] Date of Patent: May 3, 1988

[54] MULTISTATISTICS GATHERER

[75] Inventor: Michael F. Deering, Mountain View, Calif.

[73] Assignee: Fairchild Camera & Instrument Corporation, Mountain View, Calif.

[21] Appl. No.: 785,352

[22] Filed: Oct. 7, 1985

[51] Int. Cl.⁴ ............................................. G06K 9/46
[52] U.S. Cl. ...................................... 382/18; 382/51; 358/166
[58] Field of Search ............................ 382/18, 26, 51; 358/166, 284; 364/736, 553, 554

[56] References Cited

U.S. PATENT DOCUMENTS

| | | | |
|---|---|---|---|
| 3,983,320 | 9/1976 | Ketcham et al. | 358/166 |
| 4,212,072 | 7/1980 | Huelsman et al. | 358/166 |
| 4,365,304 | 12/1982 | Ruhman et al. | 382/51 |
| 4,450,482 | 5/1984 | Ackerman | 358/166 |
| 4,606,065 | 8/1986 | Beg et al. | 382/18 |
| 4,624,013 | 11/1986 | Urushibata | 382/26 |
| 4,672,220 | 6/1987 | Haberl | 364/736 |

Primary Examiner—Leo H. Boudreau
Assistant Examiner—Steven Brim
Attorney, Agent, or Firm—Theodore S. Park; Robert C. Colwell; Charles E. Krueger

[57] ABSTRACT

A subsystem component for use in an image processing system to compute a gray scale histogram function or various statistical functions relating to the coordinates of a region or regions in a binary image. A selected function is computed at the video rate of frame generation.

11 Claims, 4 Drawing Sheets

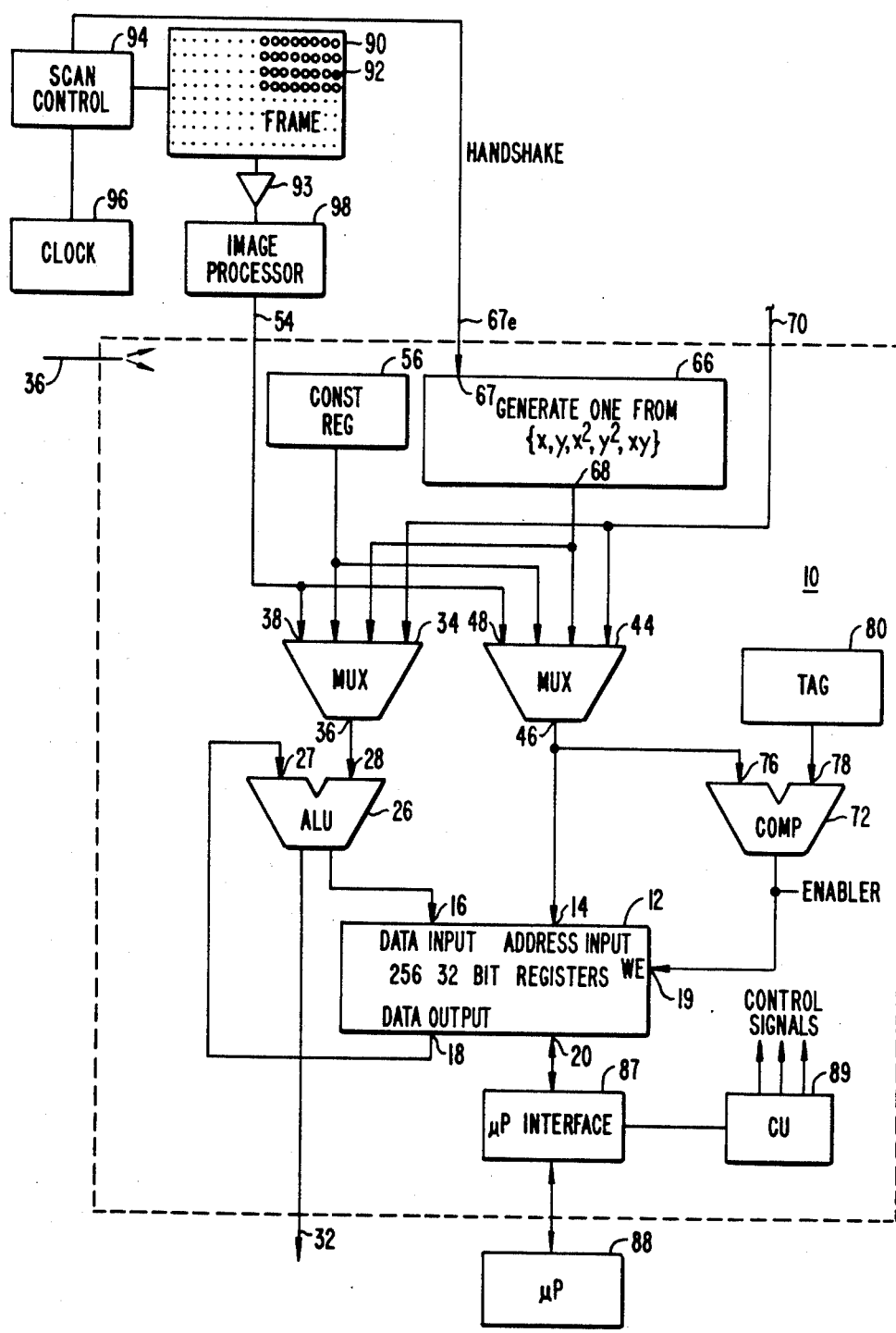
FIG._1.

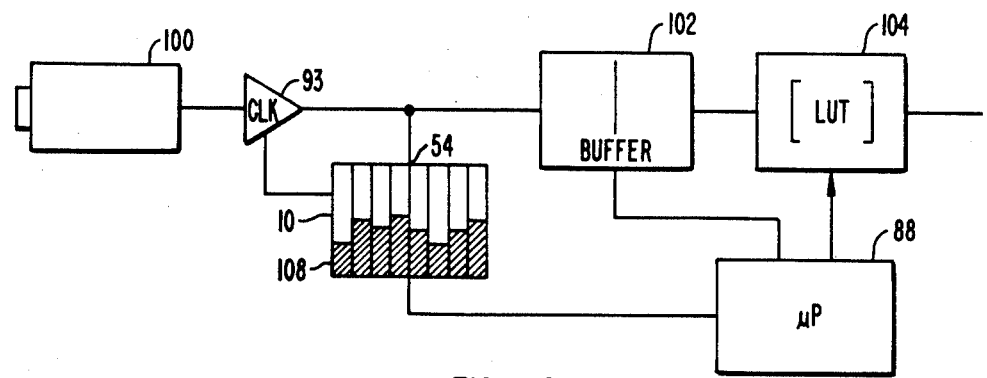
FIG._2.
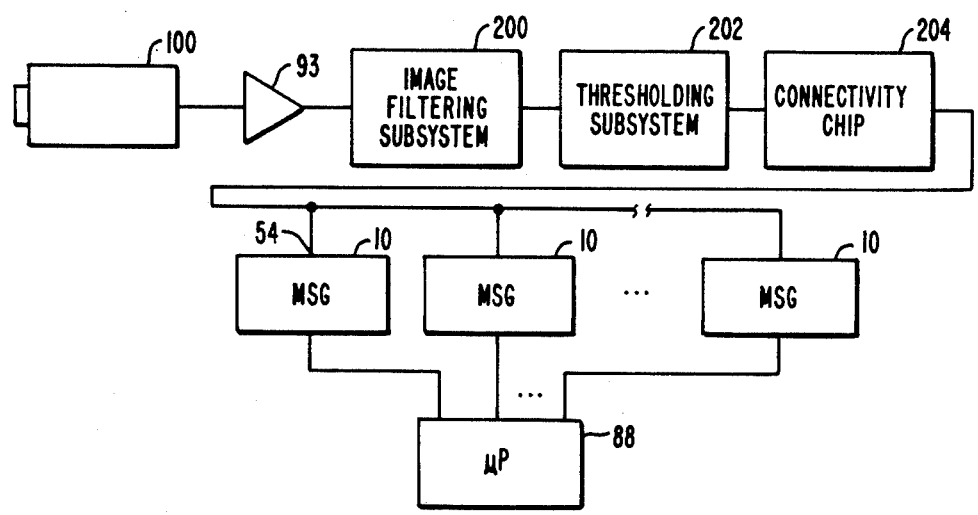
FIG._3.
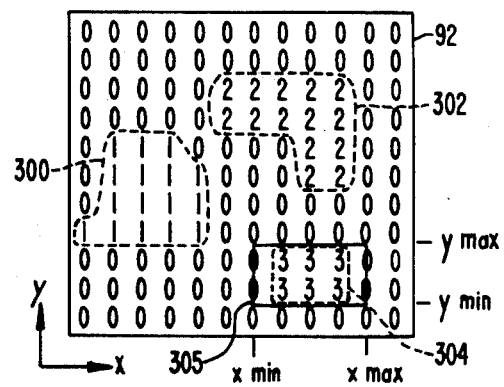
FIG._4.

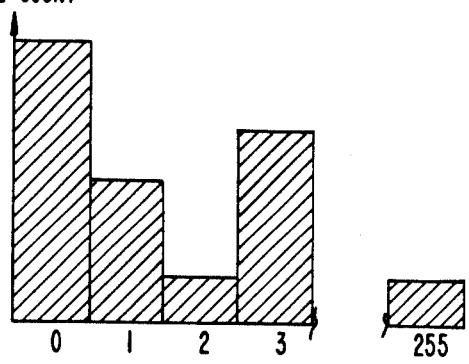
FIG._9.
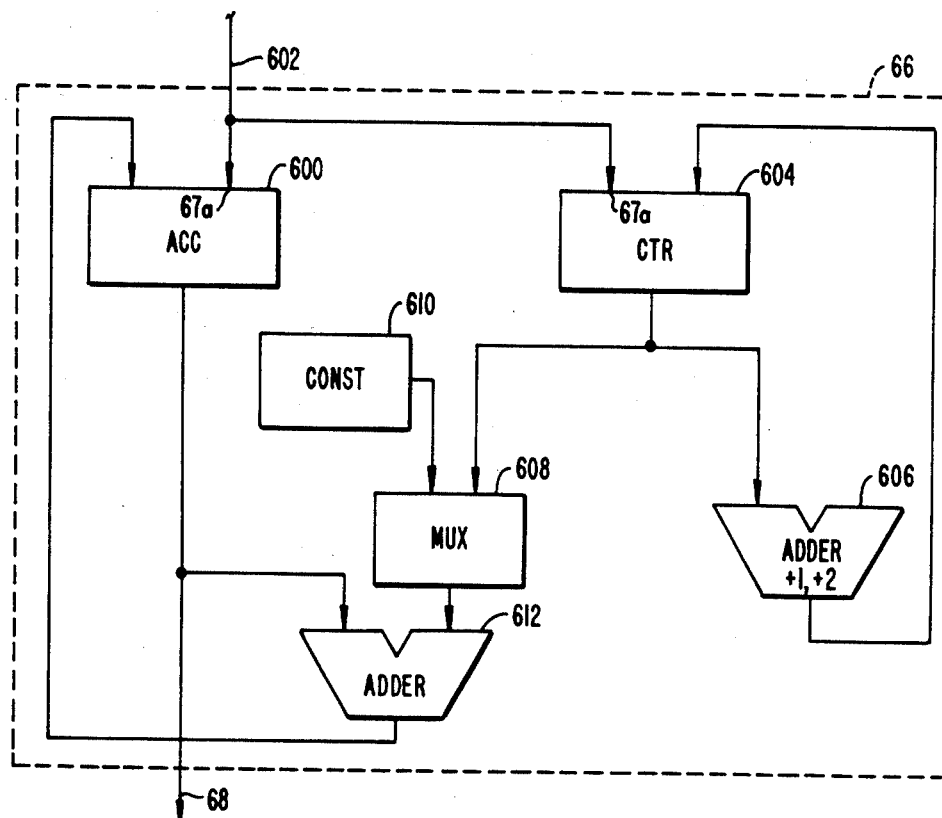
FIG._10.

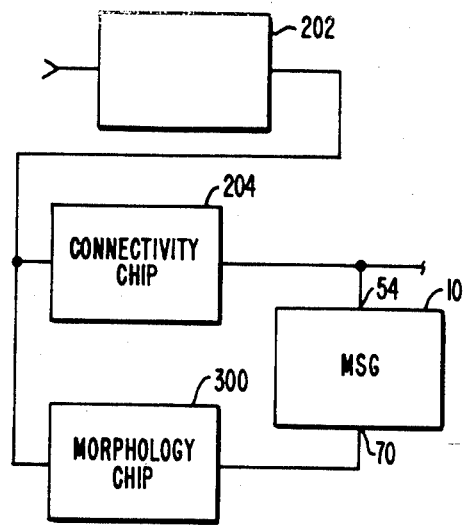
FIG._5.
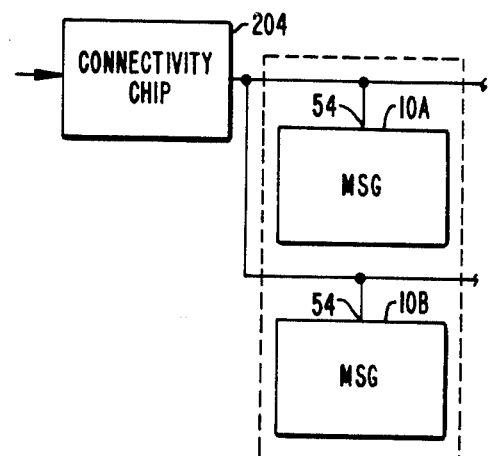
FIG._5A.
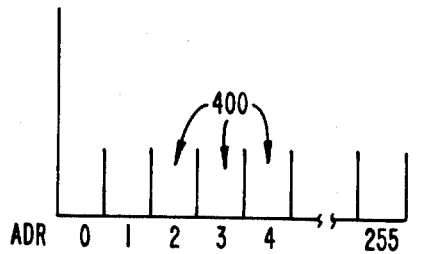
FIG._6A.
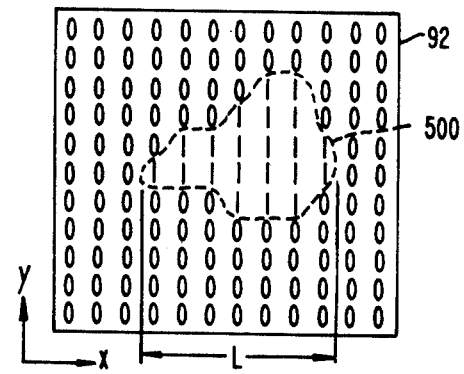
FIG._6B.
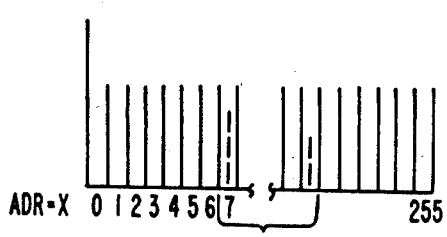
FIG._7.
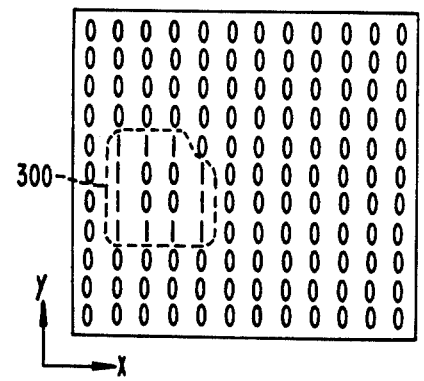
FIG._8.

MULTISTATISTICS GATHERER

BACKGROUND OF THE INVENTION

1. Field of the Invention

The invention relates generally to digital image processing and, more particularly, to the statistical analysis of digital images for use in processing the image and for determining characteristics of objects in the image.

2. Description of the Relevant Art

Recent advances in automation utilize artificial intelligence to identify objects and to provide information relating to the position, shape, orientation, and other characteristics of the objects.

The "eye" of the artificial intelligence system is a video camera and processor that generates a digital images or frames. Each frame is comprised of pixels which are digital values assigned to unit areas of an image or frame. Typically, the pixel output from a video camera is a gray scale value indicating light intensity at a specified unit area. The location of a pixel in the frame is indicated by its x,y coordinates. The y coordinate identifies the line of the frame and the x coordinate identifies the position in the line of the pixel.

Once the "eye" of the system has formed an image the "brain" of the system must interpret the image. One method of interpreting the image is to store in memory some selected characteristics of a reference object. The video system then analyzes the video image to determine the selected characteristics of objects in the image. These determined characteristics of the objects in the image may then be compared to the stored characteristics of the reference object.

Prior to determination of object characteristics the image is converted from a gray scale to a binary image. This conversion includes statistical analysis of the image to determine a suitable threshold level. Pixels having a gray scale value above the threshold are converted to binary ones and pixels having a gray scale value below the threshold are converted to binary zeros.

For example, if the selected characteristic were the area of a reference object in the frame, then a reference value of this area is stored in memory. The determined value of the area of an object in an image is supplied to a processor. The processor then compares the areas of the referenced object and the imaged object and decides whether the objects are identical in this parameter.

In one type of system, the selected characteristics of the imaged objects are determined by statistical connectivity analysis of a binary image. The processing is performed in several stages. First, the image is subjected to connectivity analysis for identifying connected regions in the image. Each separate region is given a unique label where the labeled regions correspond to major objects in the image. Statistics pertaining to the number of pixels in a region, the positions of pixels in the region, and the number of pixels on the boundary of a region are then computed for each object separately. These statistics are utilized to determine characteristics of an object, its area (size), its centroid (center), its major axis (orientation), and its length-to-width ratio (squat? thin?). These characteristics are then used as the basis for further processing.

In another type of system, the x and y projections of an object may be compared to equivalent statistics for a referenced object.

In existing systems, an entire frame is stored in memory and the various algorithms are utilized to perform statistical measurements on the objects in the frame. Typically, a video camera generates 30 to 60 frames per second with each frame comprising over up to 250,000 or more pixels. These existing systems utilize computers to perform the statistical measurements described above. Typically these measurements take many multiples of the 1/30 sec. frame time to complete for each frame. The calculated statistics are utilized by the system processor to determine object characteristics for use in image interpretation.

The results of the image interpretation may be utilized to control an automated system. The speed of image interpretation is critical to increase the efficiency of the automated system.

In the existing statistical measurement systems described above, the image interpretation process is slow relative to the video rate of operation of the camera or "eye" of the system. These existing systems are not able to provide the statistical measurements to the system processor at the end of each frame. For example, although 30 to 60 frames could be supplied every second, it can take over a second to analyze the results of a single frame. Thus, the "brain" of the system is much slower than the "eye."

If the above-described image characterization is utilized in a control loop for an automated system, then the cycle time for the loop would be very long. The system would necessarily be very slow and of limited utility.

Accordingly, a great need exists in the artificial intelligence and video image processing arts for a system for performing statistical analysis which operates at the video rate of the video camera and provides statistical measurements at the end of each frame.

SUMMARY OF THE INVENTION

The present invention is a multifunctional unit for use in the connectivity analysis subsystem of a video image processing system. The multifunctional unit computes statistics relating to the number and positions of pixels in a region of a video image. The multifunctional unit may also be utilized to compute the x and y projection of a region in either a gray scale or binary image and to generate histograms of pixels in an image. The results of the statistical analyses and computations are generated at the video rate at which frames are provided to the system.

According to one aspect of the invention, the subsystem includes a register bank for gathering statistics. The register bank is configured as a random access memory (RAM) having an address input port for accepting an address-select signal. The address-select signal selects a particular register. The RAM also includes a write enable input (WE), a data input port, and a data output port.

An ALU has a first ALU input port coupled to the RAM data output port, a seocnd ALU input port for receiving an increment value, and an ALU output port coupled to the data input port of the RAM. During an increment cycle, the ALU increments the word stored in a register specified by the address-select signal by the increment value.

According to a further aspect of the invention, the subsystem includes a first pixel input for receiving a pixel in a frame and a function generator for generating a function output signal specifying the value of an arithmetic function of the x and y coordinates of the received pixel. The received pixel and the function output signal may be utilized as either the address-select or increment value.

According to a further aspect of the invention, the subsystem includes a second pixel input. Either pixel input can be coupled to either the address input port of the RAM or the second input of the adder.

According to a further aspect of the invention, a constant register is included in the subsystem. An address multiplexer couples the address input port to either the first pixel input, the second pixel input, the function generator, or the constant register. Similarly, an increment multiplexer couples the second input of the adder to either the first pixel input, the second pixel input, the function generator, or the constant register.

According to a further aspect of the invention, two or more subsystems may operate in parallel with a single address space defined. A comparator receives the high order bits of the address signal at one input and the contents of a TAG register at its other input. The output of the comparator is coupled to the WE port.

According to a further aspect of the invention, a selected word stored in an addressed register may be divided into max and min segments. The ALU is configured to determine whether an input value at the second ALU input port is greater than the max value encoded by the max field or less than a min value encoded by the min field. If the input value is greater than the max value, then the max segment is modified to encode the input value. If the input value is less than the min value, then the min segment is modified to encode the input value. If the input value is between the max and min values, then neither the max nor min segments are modified. Subsequent to the compare and modify operations, the selected word is written into the addressed register. In this mode, the multifunctional unit can compute the boundary rectangle of a connected region in an image.

In one embodiment, the subsystem is fabricated on a single silicon IC chip utilizing VLSI technology. The IC chip includes a microprocessor interface for coupling the chip to a system processor. The processor provides control signals to the chip through an interface. Additionally, data is transferred between the chip and the processor via the interface.

BRIEF DESCRIPTION OF THE FIGURES

FIG. 1 is a block diagram of an embodiment of the invention;

FIG. 2 is a block diagram of a thresholding system utilizing the present invention;

FIG. 3 is a block diagram of a system for performing connectivity analysis utilizing the present invention;

FIG. 4, a diagram of a connectivity analyzed region;

FIG. 5 is a block diagram of a system for measuring the perimeter of a region utilizing the present invention;

FIG. 5A is a block diagram of a system having an address space defined over two parallel MSG chips;

FIG. 6A is a schematic diagram of a register bank;

FIG. 6B is a diagram of an image illustrating the x projection of an object;

FIG. 7 is a schematic diagram of the register bank illustrating the computation of an x projection;

FIG. 8 is a diagram of the output of a morphology chip;

FIG. 9 is a graph of a gray scale histogram; and

FIG. 10 is a block diagram of the function generator.

DETAILED DESCRIPTION OF THE PREFERRED EMBODIMENTS

FIG. 1 is a schematic diagram of a preferred embodiment of the invention. Referring now to FIG. 1, the system is fabricated on a single IC multistatistics gatherer (MSG) chip 10 utilizing standard VLSI technology. A high speed random access memory (RAM) 12 has an address input port 14, a data input port 16, a data output port 18, a write enable (WE) input 19, and an interface port 20. The RAM 12 is a bank of 256 32-bit registers.

An ALU 26 has a first ALU input 27 coupled to the data output port 18 of the RAM, and a second ALU input 28.

An increment select MUX 34 has a select signal output port 36 coupled to the second ALU input port 28 of the ALU 26. The increment multiplexer 34 also includes a set of increment select input ports 38.

An address select multiplexer 44 has an address select output port 46 coupled to the address input port 14 of the RAM 12. The address select multiplexer has four address select input ports 48. A first pixel input external port 54 is coupled to the first address select input port of the address select MUX 44 and the first increment select port of the increment select MUX 34.

A constant register 56 has an output port coupled to the second address select input port 48 of the address select multiplexer 44 and to the second increment select input port 38 of the increment select multiplexer 34.

A function generator 66 has a handshake signal input port 67 coupled to handshake signal external port 67e. The function generator 66 may be configured to generate a selected f(x,y) of the x and y coordinates of a pixel. The output port 68 of the function generator 66 is coupled to the third address select input port 48 of the address select multiplexer 44 and to the third increment select port 38 of the increment select multiplexer 34. A second pixel input external port 70 is coupled to the fourth address select input port 48 of the address select multiplexer 44 and to the fourth increment select input port 38 of the increment select multiplexer 34.

A comparator 72 has a first comparator input 76 coupled to the address select output port 46 of the address select multiplexer 44, and a second comparator input 78. A tab register 80 includes an output port coupled to the second comparator input 78 of the comparator 72. The output of the comparator 72 is coupled to the WE input 19 of the RAM 12.

A clock signal external pin 86 supplies a clock signal to synchronize the operations of the system components.

A microprocessor interface 87 couples the IC MSG chip 10 to a system processor 88. The interface port 20 of the RAM 12 is coupled to the processor interface 87. A control unit 89 is coupled to the processor interface 87. The control unit 89 controls the increment and address-select MUXs 34 and 44, selects the function to be generated by the function generator 66, loads the constant and TAB registers 56 and 80 and performs other control functions through the interface 87. The connections between the control unit 89 and functional elements on the MSG chip 10 are standard and not shown.

Data is transferred between the RAM 12 and the processor 88 via the interface 87.

Although not part of the invention, elements of the image processing system external to the MSG chip 10 are depicted in FIG. 1 to facilitate describing the operation of the invention.

The screen 90 of the video camera in the system is divided into elementary units of area 92. The level of analog output signal indicates the image intensity on a given unit area. This signal is digitized by an ADC 93 to form a digitized gray scale pixel. The entire screen in scanned by an image scan control system 94 to form an image or frame. The frames are generated at a video rate determined by the frame clock 96.

Typically, 30 to 60 frames are generated each second. Every frame includes about 250,000 pixels. Accordingly, the pixel processing rate is about 10 to 20 MHz. The pixels are routed to an image processing system 98. The frame clock 96 generates a pixel processing clock signal at the pixel processing rate.

The scan control circuitry 94 includes a handshake output coupled to the handshake input external port of the chip 67e. First and second handshake signals are asserted at the end of each line scan and at the beginning of each frame, respectively.

Several functions that the MSG chip 10 can perform in an image processing system will now be described with reference to FIGS. 2 through 5. The operation of the MSG chip 10 to perform these functions will be described below.

FIG. 2 is a block diagram of an image processing system in which the MSG chip 10 is utilized to form a histogram of gray scale values for use in the thresholding system that converts a gray scale image to a binary image.

Referring now to FIG. 2, a camera and synch generator 100 has its output coupled to the input of an ADC 93. The output of the ADC 93 is coupled to the first pixel input 54 of the MSG chip 10 and to the input port of a dual-ported frame buffer 102. The output of the frame buffer 102 is coupled to a look-up table (LUT) 104. A system processor 88 is coupled, via processor interface circuitry, to the MSG chip 10, the frame buffer 102, and the LUT 104.

The MSG chip 10 is configured by the processor to form a histogram of the gray scale values of the pixels in one frame. The figure shows an exemplary histogram eight-level gray scale. In the example, the horizontal axis is divided into eight bins 108 with each bin for counting the number of pixels having one of the 8 possible gray scale value.

The frame buffer 102 is a large memory bank which stores the incoming pixels until all the pixels of frame have arrived.

The processor 88 reads the histogram at the end of each frame, and applies a standard algorithm to determine a threshold value. The threshold value is used to create a thresholding function to be loaded into the LUT 104.

During a next frame cycle, the image pixels are transferred from the frame buffer 102 to the thresholded LUT 104. The output image from the LUT 104 is a binary image having pixels with values of binary zero or binary one only.

FIG. 3 is a schematic diagram of a system utilizing the MSG chip 10 to measure statistics of a region in an image. Referring now to FIG. 3, the camera 100 is coupled to the ADC 93. The ADC output is received by an image filtering conditioning subsystem 200. The output of the subsystem 200 is transferred to a thresholding system 202, e.g., a system as depicted in FIG. 2.

The output of the thresholding subsystem 202 is coupled to the input of a connectivity analysis chip 204. The output of the connectivity analysis chip 204 is coupled to the first pixel inputs 54 of a set of MSG chips 10. The MSG chips 10 are coupled to a microprocessor 88 via the microprocessor interface 87 of each MSG chip 10.

The function of the connectivity chip 204 will be briefly described with reference to FIG. 4. Referring now to FIG. 4, a frame 92 is depicted. The frame 92 depicted in FIG. 4 includes first, second, and third connected regions 300, 302, and 304. The connectivity chip assigns a selected numeric label to each pixel in a connected region. For example, every pixel in the first region 300 is assigned the value 1, every pixel in the second region 302 is assigned the value 2, and every pixel in the third region 304 is assigned the value 3.

The processor 88 configures the control unit 89 on each MSG chip 10 to cause the chip to measure a particular statistic related to the regions in a frame. For example, a first chip may be configured to compute the sum of the x coordinate of each pixel for each region ($\Sigma x$). Other statistical quantities that may be computed include $\Sigma y$, $\Sigma x^2$, $\Sigma y^2$, and $\Sigma xy$. Additionally, the area of each region may be computed by counting the number of pixels in the region, ($\Sigma 1$).

The use of an MSG chip 10 to compute an external feature, i.e., the perimeter, of a connected region in a frame will now be described with reference to FIG. 5.

In FIG. 5, the output of the thresholding subsystem 202 is coupled to the inputs of a connectivity analysis chip 204 and of a morphology chip 300. The output of the connectivity analysis chip 204 is coupled to the first pixel input of an MSG chip 10. The output of the morphology chip 300 is coupled to the second input of the MSG chip 10.

The morphology chip 300 may be configured to assign a value of one to a pixel on the perimeter of a connected region and a value of zero to all other pixels in the frame. The MSG chip 10 is configured by the processor 88 to count the number of pixels in the perimeter of each region.

Referring back to FIG. 3, one of the MSG chips 10 may be configured by the processor to compute the projection of a single object in a frame on either the vertical, y, axis or the horizontal, x, axis of the frame. Each MSG chip 10 may compute only a single projection of one object in the frame. Accordingly, with the addition of look-up tables, several chips may be connected in parallel to compute the projections of a number of objects in a single frame.

The use of the MSG chip 10 to determine the boundary rectangle of a region will now be described with reference to FIGS. 3 and 4. In FIG. 4, the boundary rectangle 305 of the third connected region 304 is depicted. This boundary rectangle 305 is defined by the values $x_{min}$, $X_{max}$, $Y_{min}$, and $Y_{max}$, which are computed by the MSG chip 10.

The clock input 56 must be coupled to a clock synchronized at the rate at which pixels are supplied to the pixel inputs 54 and 70. For example, in FIG. 2, the clock input 56 is coupled to the clock controlling the pixel output rate of the ADC 93.

A typical image processing problem is the following. A system processor is programmed to discard all objects having an area less than A(ref), or to discard all objects with centroids positioned between $x_1$(Ref) and $x_2$(Ref). The statistical computations required to determine these characteristics of each region are the number of pixels in the region, the sum of the x coordinates of all the pixels in a given region ($\Sigma x$), the sum of the y coordinates of all the pixels in a given region ($\Sigma y$). Additionally, the statistical quantities $\Sigma x^2$, $\Sigma y^2$, and $\Sigma xy$ may be utilized to determine the elongation and orientation of the region.

The configuration of the MSG chip 10 to perform the functions described are listed in Table 1. In Table 1, the first column input indicates whether the pixel value indicates the intensity of the pixel, i.e. gray scale, or indicates the connected regions in a binary image frame, i.e. labelled binary. The second column, address-sel, indicates the input signal to the address input 14 of the RAM 12, the third column, increment-sel, indicates the signal at the second input port 28 of the ALU 26, and the final column, statistic computed, indicates the information contained in the statistical measurement or the object characteristic which may be determined from the statistic computed.

TABLE 1

| Input | Address-sel | Increment-sel | Statistic Computed |
|---|---|---|---|
| gray scale | input 1 | constant = 1 | histogram |
| labelled binary | input 1 | constant = 1 | region areas |
| labelled binary | input 1 | x | first moment about x axis |
| labelled binary | input 1 | y | first moment about y axis |
| labelled binary | input 1 | $x^2$ | second moment about x axis |
| labelled binary | input 1 | $y^2$ | second moment about y axis |
| labelled binary | input 1 | xy | summed xy |
| labelled binary | input 1 | input 2 | count external feature |
| gray scale, binary, or labelled binary | x | input 1 | x-projection |
| gray scale, binary, or labelled binary | y | input 1 | y-projection |
| labelled binary | input 1 | x | $x_{min}, x_{max}$ |
| labelled binary | input 1 | y | $y_{min}, y_{max}$ |

A detailed description of the operation of the MSG chip 10 to perform these functions follows.

FIG. 6A is a schematic diagram of the RAM 12 showing the storage location of the RAM as registers or bins 400. The statistical computation of the area of a region will be described with reference to FIGS. 1, 4, and 6.

Referring first to FIG. 1, the increment select multiplexer 34 is set to couple the output of the constant register 56 to the second input of the adder 26. The constant in the constant register 56 is set to 1. The address select multiplexer 46 is set to couple the first pixel input pin 54 to the address input port 14 of the RAM 12.

For the regions depicted in FIG. 4, the pixel input values are either 0, 1, 2, or 3. Thus, only 0 through 3 bins 400 (FIG. 6A) will be accessed by the pixels.

As the frame is scanned, the value of each pixel determines which storage bin is accessed. For example, for each pixel in the third region 304, the word in bin 3 is accessed and directed to the adder 26. The value of the accessed word is incremented by the constant (equal 1) in the constant register and returned to bin 3. Thus, when the frame scan is completed the number stored in bin 3 is equal to the number of pixels in the third region 304. This number is a measure of the area of bin 3 since each pixel represents a unit area of the image frame. Similarly, the numbers stored in bins 1 and 2 are measures of the area of regions 1 and 2.

Thus, at the end of each frame cycle an MSG chip 10 provides the area of first, second and third regions 300, 302, 304 to the processor 88.

The calculation of $\Sigma x$ will now be described. Referring to FIG. 1, the function generator 66 is configured to calculate $f(x,y) = x$.

The increment select multiplexer 34 is controlled to couple the output port 68 of the function generator 66 to the second input port 28 of the adder 26. The address select multiplexer 46 is controlled to couple the first pixel input pin 54 to the address input port 14 of the RAM 12.

Again, as in the previous example, only bins 0 through 3 will be accessed by the pixels. As the frame is scanned, the value of the pixel determines which storage bin is accessed. For example, each pixel in the third region 304, the word in bin 3 is accessed and directed to the adder 26. The value of the word is incremented by the value of the x coordinate of the pixel and returned to bin 3. Thus, when the frame scan is completed, the number stored in bin 3 is equal to the sum of the x values of each pixel in the third region 304. The processor calculates the x coordinate centroid of the third region 304 by dividing this sum by the area of the third region 304 supplied from another MSG chip 10 in the set depicted in FIG. 3.

An x projection (y squash) operation is depicted in FIGS. 6A, 6B, and 7. Referring to FIG. 6B, an image is defined in the frame 92. The projection of the region on the x axis is another feature of interest of an object of the region. Referring back to FIG. 1, the function generator 66 is configured to generate the function $f(x,y) = x$. The address select MUX 44 is controlled to couple the output port 68 of the function generator 66 to the address input port 14 of the RAM 12.

The increment select multiplexer 34 is controlled to couple the first pixel input pin 54 to the second input of the adder 26.

Referring now to FIG. 7, the x coordinate of each pixel input accesses the bin 130 having an address equal to x.

The determination of $x_{min}$ and $x_{max}$ for a labelled binary region will now be described with reference to FIGS. 1 and 4. The ALU 26 can be configured to simultaneously perform a max/min comparison between an input value and max and min values encoded in max and min segments of a word stored in an addressed register.

For example, the first sixteen bits of a 32 bit selected word in the addressed register could be the min segment encoding a min value and the second sixteen bits could be a max segment encoding a max value.

When the register is addressed, the selected word is directed to the first input 27 of the ALU 26. The min and max values are compared to an input value at the second input of the ALU 26. If the input value is less than the min value, then min segment of the selected word is modified to encode the input value and the max segment is unmodified. If the input value is greater than the max value, then the max field is modified to encode the input value and the min field is unmodified. If the input value is between the min and max values then neither the min segment nor the max segment is modified.

The selected word is directed back to the addressed register upon completion of the comparison and modification operations.

The $x_{min}/x_{max}$ determination is performed utilizing a labelled binary image as depicted in FIG. 4. The function generator 66 is configured to generate an output equal to $f(x,y)=x$ and the function generator output port is coupled to the second input 28 of the ALU 26 by the increment select MUX 34. The first pixel input port 58 is coupled to address port 14 of the RAM 12.

The determination of $x_{min}/x_{max}$ for the third region 304 in FIG. 4 will now be described. Each pixel in the third region is labelled with the numeral 3. Thus, as each pixel in region 3 is received at the first pixel input port 54, the x value of the pixel is compared to the min and max values stored in the third register. The min segment is modified if the x value is less than the min value or the max segment is modified if the x value is greater than the max value.

At the end of the frame the min value will be the smallest x value of any pixel in the third region 304, i.e., $x_{min}$. The max value will be the greatest x value of any pixel in the third region 304, i.e., $x_{max}$.

The values of $y_{min}$ and $y_{max}$ can be similarly determined by configuring the function generator 66 to generate an output equal to $f(x,y)=y$.

FIG. 5A depicts a configuration having 2 MSG chips 10 configured to define a signal address space having 512 registers in the RAM 12.

Referring now to FIG. 5A, the first inputs of MSG chips 10A and 10B are coupled to the output port of the connectivity chip 204.

An example of the need for an extended address space is an x-projection computation as illustrated in FIGS. 6B and 7. For an x-projection the registers in the RAM 12 are addressed by the x coordinate of the object 500. If the image width is greater than 255, then a single MSG chip 10 would run out of registers.

A single address space may be defined utilizing the TAG register 80 and comparator 27 (FIG. 1).

For the example described above, the MSG chip 10A includes registers 0 to 255 and MSG chip 10B includes registers 256 to 511.

The ninth bit of the nine or more bit binary address for registers 0 to 255 is equal to zero and for registers 256 to 511 is equal to one.

Referring back to FIG. 1, the ninth bit of the address-select signal from the address MUX 44 is directed to the first comparator input 76 of MSG chips 10A and 10B. In chip 10A the content of the TAG register 80 is set to zero and in chip 10B the content of the TAG register 80 is set to one.

In operation, for $x<256$, the ninth bit is zero and the output of the comparator 27 in MSG chip 10A is high and in chip 10B is low. Thus, only the WE input 19 of the RAM 12 in chip 10A is enabled. The pixel value is written into a register of the RAM 12 in chip 10A.

For $x>256$, the ninth bit is one and output of the comparator 27 in chip 10A is low and in chip 10B is high. Thus, only the WE input of the RAM 12 in chip 10B is enabled. The pixel value is written into a register of the RAM 12 in chip 10B. Thus, an extended address space is defined that allows an operation to be stacked over more than one chip.

The computation of the perimeter of a region will now be described with reference to FIGS. 1, 4, and 8.

Referring to FIG. 8, the output of the morphology chip 300 is depicted. Pixels on the perimeter of the region are assigned the value of one and all other pixels in the region are assigned the value zero. To compute the perimeter of the first region 300 of FIG. 4 the output of the connectivity chip 204 is connected to the first pixel input 54 of the MSG chip 10 and the output of the morphology chip 300 is connected to the second pixel input 70.

The increment MUX 34 is controlled to couple the second pixel input 70 to the second input of the adder 26. The address MUX 44 is controlled to couple the first pixel input 54 to the address input port 14.

The computation of the perimeter of the first region will now be described with reference to three areas of the frame, the background, the perimeter of the first region, and the interior of the first region. A pixel in the background is assigned the value zero by both the connectivity chip 204 and the morphology chip 300. Thus, the zeroth bin is addressed by the connectivity chip output and the word in the zeroth bin is incremented by zero. Thus, the zero bin is not incremented for pixels in the background area. Referring next to the interior of the first region, the bin having address number 1 is selected by the output from the connectivity chip and the word in bin 1 is incremented by zero, the value of the pixel from the morphology chip. Finally, referring to the perimeter, the bin 1 is selected by the output of the connectivity chip and the word stored in bin 1 is incremented by one, the value of the pixel from the morphology chip. Thus, the value in bin 1 is incremented by the number of pixels on the perimeter of the region during one frame scan. This number is a measure of the perimeter and is computed for each object.

The computation of a gray scale histogram will now be described with reference to FIGS. 1 and 9. Referring to FIG. 9, typically the gray scale is divided into 256 intervals, with the zeroth interval being black and the 255th interval representing the highest light intensity. The histogram indicates the number of pixels in a frame having each value in the gray scale.

Referring now to FIG. 1, to compute a gray scale histogram, the first pixel input 70 is coupled to the address input port 14 by the address MUX 44. The value in the constant register 56 is set to one and the output of the constant register is coupled to the second input of the adder 26 by the increment multiplexer 34.

In operation, each pixel addresses a bin representing the gray scale value of the pixel. The word in the bin is incremented by one each time a pixel having that gray scale is inputted. Thus, at the end of a frame a gray scale histogram has been constructed. This operation can be stacked for longer histogramming.

The operation of the function generator 66 will now be described with reference to FIG. 10 and Table 2.

Referring to FIG. 10, an accumulator 600 has a handshake input 602 coupled to handshake port 67. A counter 604 has a handshake input coupled to handshake pin 67. An adder 606 has a left input coupled to the output of the counter 604 and an output coupled to the input of the counter 604. The output of the counter 604 is also coupled to a first input of a MUX 608. The second input of the MUX 608 is coupled to the output of a constant register 610. The right input of a second adder 612 is coupled to the output of MUX 608 and a right input of the second adder 612 is coupled to the output port of the accumulator 600. The output port of the second adder 612 is coupled to the input port of the accumulator 600. The output port of the accumulator 600 is coupled to the output port 68 of the function generator 66.

At the beginning of each frame the first handshake signal is asserted and at the end of each line in a frame the second handshake signal is asserted. These handshake signals are received at port 67. The accumulator 600 and counter 604 values are set by the control logic 89 at the beginning of each frame and end of each line according to the function to be calculated. Additionally, the accumulator 600 and counter 604 values are incremented by the control logic 89 (FIG. 1) upon the receipt of each new pixel.

Table 2 depicts the accumulator (ACC) and counter (CTR) values for each new frame, each new pixel received during a frame, and at the end of each line in a frame for the functions x, y, xy, $x^2$, and $y^2$. For example, to compute x the accumulator is set to zero at the beginning of a frame and at the end of each line. As each pixel is received the accumulator value is incremented by one. The generation of each function listed in the table is achieved by utilizing the initial values, incrementation values, and end of line resets listed in the table.

TABLE 2

| Function | New Frame | New Pixel | End Line |
|---|---|---|---|
| x | ACC ← 0 | ACC ← ACC + 1 | ACC ← 0 |
| y | ACC ← 0 |  | ACC ← ACC + 1 |
| xy | ACC ← 0 | ACC ← ACC + CTR | ACC ← 0 |
|  | CTR ← 0 |  | CTR ← CTR + 1 |
| $x^2$ | ACC ← 0 | ACC ← ACC + CTR + 1 | ACC ← 0 |
|  | CTR ← 0 | CTR ← CTR + 2 | CTR ← 0 |
| $y^2$ | ACC ← 0 |  | ACC ← ACC + CTR + 1 |
|  | CTR ← 0 |  | CTR ← CTR + 2 |

The calculation of $x^2$, xy, and $y^2$ utilizes an iterative technique. For example, once an $x^2_i$ value has been determined for a given pixel i then the $x^2_{i+1}$ value for the next pixel is given by:

$$x^2_{i+1} = (x_i+1)^2 = x_i^2 + 2x_i + 1 \quad \text{EQUATION 1}$$

Therefore, the value of $x^2_{i+1}$ is determined by knowledge of $x^2_i$ and $x_i$.

Turning to Table 2, for the computation of $x^2$, the values of ACC and CTR are set to zero at the beginning of each frame. The $ACC_0$ and $CTR_0$ are both zero. For $x_1=1$, $x^2_1=1$, and from Table 2:

$$ACC_1 = ACC_0(=0) + CTR_0(=0) + 1 = 1 = x^2_1 \quad \text{EQUATION 2}$$

$$CTR_1 = CTR_0(=0) + 2 = 2 \quad \text{EQUATION 3}$$

For $x_2=2$, $x^2_2=4$, and from Table 2:

$$ACC_2 = ACC_1(=1) + CTR_1(=2) + 1 = 4 = x^2_2 \quad \text{EQUATION 4}$$

$$CTR_2 = CTR_1(=2) + 2 = 4 \quad \text{EQUATION 5}$$

Thus, incrementing the counter 604 (FIG. 2) by two for each pixel generates the $2x_i$ term on the right side of equation 1, and equations 2 and 4 are equivalent to equation 1.

The generator of xy and $y^2$ is similarly deductible from Table 2.

The invention has been described with reference to preferred embodiments. Alternate configurations and utilizations of the invention will now be apparent to persons of ordinary skill in the art. In particular, although the use of the invention in a video image processing system has been described the invention has great utility in other digital electronic fields.

For example, the first and second pixel input ports are, in fact, general data input ports. The first general data input port could be coupled to a microprocessor to receive the instructions generated by the microprocessor while executing a program. If the first data input port is coupled to the address port of the RAM and the ALU is configured to increment by one, a histogram of the occurrences of instructions while executing the program will be generated. The histogram will be complete when the program is complete.

Accordingly, the breadth of the invention is not limited except as provided by the appended claims.

What is claimed is:

1. A statistical gatherer for use in an image processing system of the type that processes a digital image comprising a frame of pixels, with the positions of the lines in the frame indicated by a y coordinate and the position of a pixel in a given line indicated by an x coordinate, and with each pixel a digital value, the statistical gatherer comprising:

an electronic RAM having an address input port for receiving an address signal identifying a selected storage location in said RAM, a data output port for transmitting a read signal encoding the value of a digital word stored in said selected storage location, and a data input port for receiving a write signal encoding the value of a digital word to be stored in the selected storage location;

address signal selection means, having an address select output port coupled to said address input port of said RAM and having a set of address select input ports for receiving signals, said address signal selection means for controllably coupling one of said address select input ports to said address select output port;

means for adding a selected increment to the digital word stored at the selected storage location in said RAM, said increment means having an increment signal input port and a read signal input port coupled to the data output of said RAM;

increment signal selection means, having an increment select signal output port coupled to the increment signal input port of said incrementing means and having a set of increment select input ports, said increment signal select means for controllably coupling one of said increment select signal input ports to said select increment signal output port;

a first pixel input coupled to a first one of said address select input ports and to a first one of said increment select input ports, said first pixel input for receiving a first digital pixel with the location of the first digital pixel in the image frame indicated by coordinates x and y;

means for generating a function output signal at a function output port, with the function output signal encoding a digital function value having a value f(x,y), and with said function output port coupled to a second one of said address select ports and a second one of said increment select ports.

2. The invention of claim 1 further comprising:
a second digital pixel input coupled to a third one of said address select input ports and to a third one of said increment select input ports, said second pixel input for receiving a second pixel having coordinates x and y.

3. The invention of claim 2, wherein said RAM includes a write enable (WE) input, the invention further comprising:
a TAG register; and
a comparator having a first input adapted to receive a selected part of said address signal, a second input coupled to said TAG register, and an output coupled to the WE input of said RAM.

4. The invention of claim 2 or 3 wherein the image processing system provides a handshake signal at the beginning of each frame and at the end of each line, said function generating means comprising:
an accumulator for generating an accumulator value, the accumulator having a handshake input adapted to receive said handshake signal, an ACC output port, and an ACC input port;
a counter for generating a counter value, the counter having a handshake input, a CTR increment input port, and a CTR output port:
means, coupled to said CTR increment port, for selectively incrementing the counter value by one or two;
means for selectively adding either the counter value or a constant to the accumulator value, with the accumulator value being the output of said function generating means.

5. A statistical gatherer for use in an image processing system of the type that processes a digital image comprising a frame of pixels, with the positions of the lines in the frame indicated by a y coordinate and the position of a pixel in a given line indicated by an x coordinate, and with each pixel a digital value, the statistical gatherer comprising:
an electronic RAM having an address input port for receiving an address signal identifying a selected storage location in said RAM, a data output port for transmitting a read signal encoding the value of a digital word stored in said selected storage location, and a data input port for receiving a write signal encoding the value of a digital word to be stored in the selected storage location;
an address signal MUX, having an address select output port coupled to said address input port of said RAM and having a set of address select input ports for receiving signals, said address signal MUX for controllably coupling one of said address select input ports to said address select output port;
an ALU, having a first ALU input port coupled to the data output port of said RAM for receiving said read signal, a second ALU input port for receiving an ALU input signal encoding an ALU input value, and an ALU output port coupled to data input port of said RAM;
means for controllably configuring said ALU to either add the ALU input value to the value encoded by the read signal or to compare a max/min value encoded by the read signal to the ALU input value and to modify said max/min value based on the outcome of said comparison;
an ALU input signal MUX, having an increment select signal output port coupled to the second ALU input port of said ALU and having a set of ALU select input ports, said ALU signal MUX for controllably coupling one of said ALU select signal input ports to said select ALU signal output port;
a first pixel input coupled to a first one of said address select input ports and to a first one of said ALU select input ports, said first pixel input for receiving a first digital pixel with the location of the first digital pixel in the image frame indicated by coordinates x and y;
means for generating a function output signal at a function output port, with the function output signal encoding a digital function value having a value f(x,y), and with said function output port coupled to a second one of said address select ports and a second one of said ALU select ports.

6. The invention of claim 5 further comprising:
a second digital pixel input coupled to a third one of said address select input ports and to a third one of said ALU select input ports, said second pixel input for receiving a second pixel having coordinates x and y.

7. The invention of claim 6, wherein said RAM includes a write enable (WE) input, the invention further comprising:
a TAG register; and
a comparator having a first input adapted to receive a selected part of said address signal, a second input coupled to said TAG register, and an output coupled to the WE input of said RAM.

8. A statistical gatherer for use in an image processing system of the type that processes a digital image comprising a frame of pixels, with the positions of the lines in the frame indicated by a y coordinate and the position of a pixel in a given line indicated by an x coordinate, and with each pixel a digital value, the statistical gatherer comprising:
an electronic RAM having an address input port for receiving an address signal identifying a selected storage location in said RAM, a data output port for transmitting a read signal encoding the value of a digital word stored in said selected storage location, and a data input port for receiving a write signal encoding the value of a digital word to be stored in the selected storage location;
address signal selection means, having an address select output port coupled to said address input port of said RAM and having a set of address select input ports for receiving signals, said address signal selection means for controllably coupling one of said address select input ports to said address select output port;
means for comparing a max/min value, encoded in a max/min section of said digital word stored at the selected storage location, to a comparison value, encoded in a comparison input signal, to determine whether said max/min value is greater than or less than said comparison value, said comparison means having a comparison signal input port and a read signal input port coupled to the data output of said RAM;
means for modifying said max/min section based on the outcome of the comparison determination;

comparison signal selection means, having a comparison select signal output port coupled to the comparison signal input port of said comparing means and having a set of comparison select input ports, said comparison signal select means for controllably coupling one of said comparison select signal input ports to said comparison select signal output port;

a first pixel input coupled to a first one of said address select input ports and to a first one of said comparison select input ports, said first pixel input for receiving a first digital pixel with the location of the first digital pixel in the image frame indicated by coordinates x and y;

means for generating a function output signal at a function output port, with the function output signal encoding a digital function value having a value f(x,y), and with said function output port coupled to a second one of said address select ports and a second one of said comparison select ports.

9. The invention of claim 8 further comprising:

a second digital pixel input coupled to a third one of said address select input ports and to a third one of said comparison select input ports, said second pixel input for receiving a second pixel having coordinates x and y.

10. The invention of claim 9, wherein said RAM includes a write enable (WE) input, the invention further comprising:

a TAG register; and a comparator having a first input adapted to receive a selected part of said address signal, a second input coupled to said TAG register, and an output coupled to the WE input of said RAM.

11. A statistical gatherer, for use in digital system, comprising:

an electronic RAM having an address input port for receiving an address signal identifying a selected storage location in said RAM, a data output port for transmitting a read signal encoding the value of a digital word stored in said selected storage location, and a data input port for receiving a write signal encoding the value of a digital word to be stored in the selected storage location;

address signal selection means, having an address select output port coupled to said address input port of said RAM and having a set of address select input ports for receiving signals, said address signal selection means for controllably coupling one of said address select input ports to said address select output port;

means for adding a selected increment to the digital word stored at the selected storage location in said RAM, said increment means having an increment signal input port and a read signal input port coupled to the data output of said RAM;

increment signal selection means, having an increment select signal output port coupled to the increment signal input port of said incrementing means and having a set of increment select input ports, said increment signal select means for controllably coupling one of said increment select signal input ports to said select increment signal output port; and a first digital input coupled to a first one of said address select input ports and to a first one of said increment select input ports, said first pixel input for receiving a first digital input signal.

* * * * *